United States Patent [19]

Dorman

[11] Patent Number: 4,464,881
[45] Date of Patent: Aug. 14, 1984

[54] READER-FILLER MACHINE FOR INSERTING FILM STRIPS INTO MICROFICHE JACKETS

[75] Inventor: Isidore Dorman, Whitestone, N.Y.

[73] Assignee: Bell & Howell Company, Chicago, Ill.

[21] Appl. No.: 338,609

[22] Filed: Jan. 11, 1982

[51] Int. Cl.³ .................. B65B 63/00; B65B 39/00
[52] U.S. Cl. ................................. 53/520; 53/255
[58] Field of Search .......... 53/246, 255, 257, 260, 53/261, 262, 263, 266 C, 266 R, 384, 390, 520, 546

[56] References Cited

U.S. PATENT DOCUMENTS

| | | | |
|---|---|---|---|
| 2,892,295 | 6/1959 | McArthur | 53/520 |
| 3,429,101 | 2/1969 | Anderson et al. | 53/520 X |
| 3,872,645 | 3/1975 | Dorman | 53/520 |
| 3,896,603 | 7/1975 | Tout | 53/520 |
| 4,231,214 | 11/1980 | Kiejzik | 53/520 |

Primary Examiner—Robert L. Spruill
Assistant Examiner—Steven P. Weihrouch
Attorney, Agent, or Firm—Michael Ebert

[57] ABSTRACT

A reader-filler machine adapted to insert a discrete strip of microfilm having a series of image frames into a selected channel of a microfiche jacket. The jacket is provided with parallel channels each having an entry slot adjacent the front end. The machine includes a film drive mechanism which cooperates with an optical viewer. The film strip is advanced by the mechanism along the track of a track block which terminates adjacent the front end of a pivoted table which is spring-loaded. The block includes a pair of pressure fingers projecting from either side of the track exit and a pair of flat locating guides flanking the fingers. In operation, the user first tilts the table downwardly with respect to the track exit and places the jacket thereon to cause the guides to enter the channels on opposite sides of the channel to be loaded, thereby orienting the selected channel with respect to the track exit. The table is then released to cause the pressure fingers to engage the borders of the selected channel and to bring the entry slot of this channel into registration with the track exit. The drive mechanism is then operated to advance the film strip or a section thereof into the selected channel, the frames on the strip being optically viewable to determine the point at which the strip is to be severed.

9 Claims, 13 Drawing Figures

READER-FILLER MACHINE FOR INSERTING FILM STRIPS INTO MICROFICHE JACKETS

BACKGROUND OF INVENTION

This invention relates generally to reader-filler machines for loading microfiche jackets, and more particularly to a machine adapted to handle discrete microfilm strips and to optically view the image frame thereon before insertion to facilitate severing the strips at the desired junctions.

Transparent microfiche jackets housing 16 or 35 millimeter film are currently in widespread use in connection with the storage and retrieval of information photographically recorded on a reduced scale. One well-known form of microfiche jacket is disclosed in U.S. Pat. No. 3,238,655, the jacket being composed of two transparent plastic panels in superposed relation laminated together by parallel ribs which define a plurality of open-ended channels adapted to accommodate microfilm strips, each carrying a series of image frames of recorded text and other documentation. To facilitate the insertion of microfilm, slots are cut in one of the panels adjacent an end thereof to provide an entry into each channel.

The loaded multi-channel jacket functions as a microfiche master from which low-cost duplicates or reference copies can be quickly made by contact printing, using diazo-processing techniques for this purpose. A similar microfiche jacket is disclosed in U.S. Pat. No. 3,866,648, the multiple film-receiving channels in this instance being defined by parallel bonding lines formed by ultrasonically fusing the plastic panels together.

U.S. Pat. Nos. 3,238,655 and 4,167,842 disclose reader-filler machines for loading and updating a multi-channel microfiche jacket with film chips. Insertions are made by placing the jacket to be filled on an inclined platform that is indexible in the Y-direction to register successive jacket channels with the leading edge of an incoming film web drawn from a reel, the film being guided in the X-direction along a trackway terminating adjacent the edge of the platform. In operation, a film section constituted by one or more image frames is advanced into a selected channel, the trailing edge of the section then being severed to form a film chip which remains in the channel. The platform is then indexed to the next channel for the next insertion.

Reader-filler machines of the type disclosed in these patents are relatively complex mechanisms which are designed for use with microfilm in reel form, the frames on the film drawn from the reel being optically viewable so that the point at which the film is to be severed for insertion in a microfiche jacket can be precisely determined.

In recent years, complete document microfilming machines designed for office use have become available, these copiers being as simple to operate as a conventional office xerographic copier. Typical of such microfilming machines is the table Model 6100 machine marketed by Electro-Optical Mechanisms, Inc. of Pomona, Calif. This self-contained machine is a microfilm processor that produces a 16 mm fully-processed film strip of six inches in length having up to 14 images thereon reduced to one twenty-fourth the original document size.

Thus the operator of the Model 6100 copier, very much in the fashion of an office xerographic copier, successively places documents of up to 8½ × 14 inches in size in the machine. The machine takes reduced-scale photocopies of these documents on film which is automatically processed, advanced and cut to yield a single microfilm strip of standard size.

Another simplified office microfilm copier is the "Micle 1200" copier manufactured by Fuji Photo Film Co., Ltd., of Tokyo, Japan. This copier is adapted to microfilm documents at a high speed (50 frames per minute), the film roll being automatically cut into strips of 12 frames each, to allow microfilming in smaller batches. This results in quicker access to required information and greatly cuts down on waiting time and film waste.

Because reel-type reader-filler machines of the type disclosed in U.S. Pat. Nos. 3,238,655 and 4,167,842 are mechanically complex, cumbersome and expensive, and are intended for use with microfiche jacket insertion on a large scale, such machines are inappropriate for use with office microfilm copiers which yield discrete film strips containing 12 or 14 frames.

In order to provide a microfilm inserter for strips of the type produced by the Fiji Photo and other office copiers, U.S. Pat. No. 4,064,677 of Takahishi et al. discloses a device having a table for retaining a microfilm jacket into which a film strip is inserted by means of feed rolls. Such strips have either a blank leader or a blank trailer.

In a conventional microfilm inserter, the film strip is first inserted in the jacket channel and the trailer is then cut along the end of the jacket to obtain a strip of proper length. Because the channel entry slot is somewhat inset from the jacket end, the conventional method of cutting the film strip along the end of the jacket makes necessary an additional positional adjustment wherein the end of the film is pushed inward until it reaches the slot. In the Takahashi patent machine, the trailer of the film strip is inserted as far as the entry slot of the jacket and the leader is thereafter cut off.

The Takahashi inserter and other known inserters for film strips are adapted to fill all channels of a microfiche jacket with microfilm strips of standard size having 12 or 14 frames. Such inserters are incapable of loading the channels with sections cut from standard strips for the purpose of providing an updatable microfiche record.

In many instances, a given record may consist of, say, 7 documents to be copied. The conventional office copier will copy three documents and release a standard strip containing 7 frames, even though it has a capacity of 12 or 14 frames. Hence if the full strip capacity is not used, the strip will have a blank zone. But with a conventional inserter for standard office copier strips, the blank zone cannot be excised, for the inserter is capable only of inserting the full strip, thereby wasting channel space and precluding updating.

An inherent advantage of a microfiche jacket as compared to a microfiche card having film frames permanently bonded or incorporated therein is that the jacket permits the record to be updated. Thus each jacket channel having a 12 frame capacity can first be partially loaded with a film section or chip containing, say, 5 frames. At a later time, an additional film section may be inserted in the same channel to update the record.

A reader-filler of the type disclosed in U.S. Pat. No. 3,872,645 has an updating capability, for the film being inserted is optically viewable and it may be severed at any desired junction between successive frames. But, as noted previously, a reader-filler of this type which includes an indexing mechanism and other complexities is inappropriate for inserting discrete film strips of the type produced by office copiers.

SUMMARY OF INVENTION

In view of the foregoing, the main object of this invention is to provide a reader-filler machine for inserting discrete strips of microfilm or sections thereof into the channels of a microfiche jacket and for optically viewing the image frames thereon before insertion to facilitate severing the strips at desired junctions.

More particularly, an object of the invention is to provide a machine of the above type in which a selected channel on the strip has its entry slot brought into positive registration with the track exit of a film drive mechanism without requiring an indexing mechanism or other complex means for this purpose.

Also an object of this invention is to provide a machine of the above type which makes it possible to insert into a selected channel of a microfiche jacket a section of standard film strip which only partly occupies the channel, the remaining portion of the channel being available for future updating of the record.

Still another object of the invention is to provide an inexpensive reader-filler machine which is simple to use and which operates efficiently and reliably.

Briefly stated, these objects are attained in a reader-filler machine adapted to insert a strip of microfilm having a series of image frames into a selected channel of a microfiche jacket. The jacket is provided with parallel channels, each having an entry slot adjacent the front end. The machine includes a film drive mechanism which cooperates with an optical viewer. The film strip is advanced by the mechanism along the track of a track block which terminates adjacent the front end of a spring-loaded pivoted table which is spring-loaded. The block includes a pair of pressure fingers projecting from either side of the track exit and a pair of flat locating guides flanking the fingers.

In operation, the user first tilts the table downwardly with respect to the track exit and places the jacket thereon to cause the guides to enter the channels on opposite sides of the channel to be loaded, thereby orienting the selected channel with respect to the track exit. The table is then released to cause the pressure fingers to engage the borders of the selected channel and to bring the entry slot of this channel into registration with the track exit. The drive mechanism is then operated to advance the film strip or a section thereof into the selected channel, the frames on the strip being optically viewable to determine the point at which the strip is to be severed.

OUTLINE OF DRAWINGS

For a better understanding of the invention as well as other objects and further features thereof, reference is made to the following detailed description to be read in conjunction with the accompanying drawings, wherein:

FIG. 13 is a transverse section taken through the microfiche jacket in the plane indicated by line 13—13 in FIG. 3.

DESCRIPTION OF INVENTION

Figure 1:
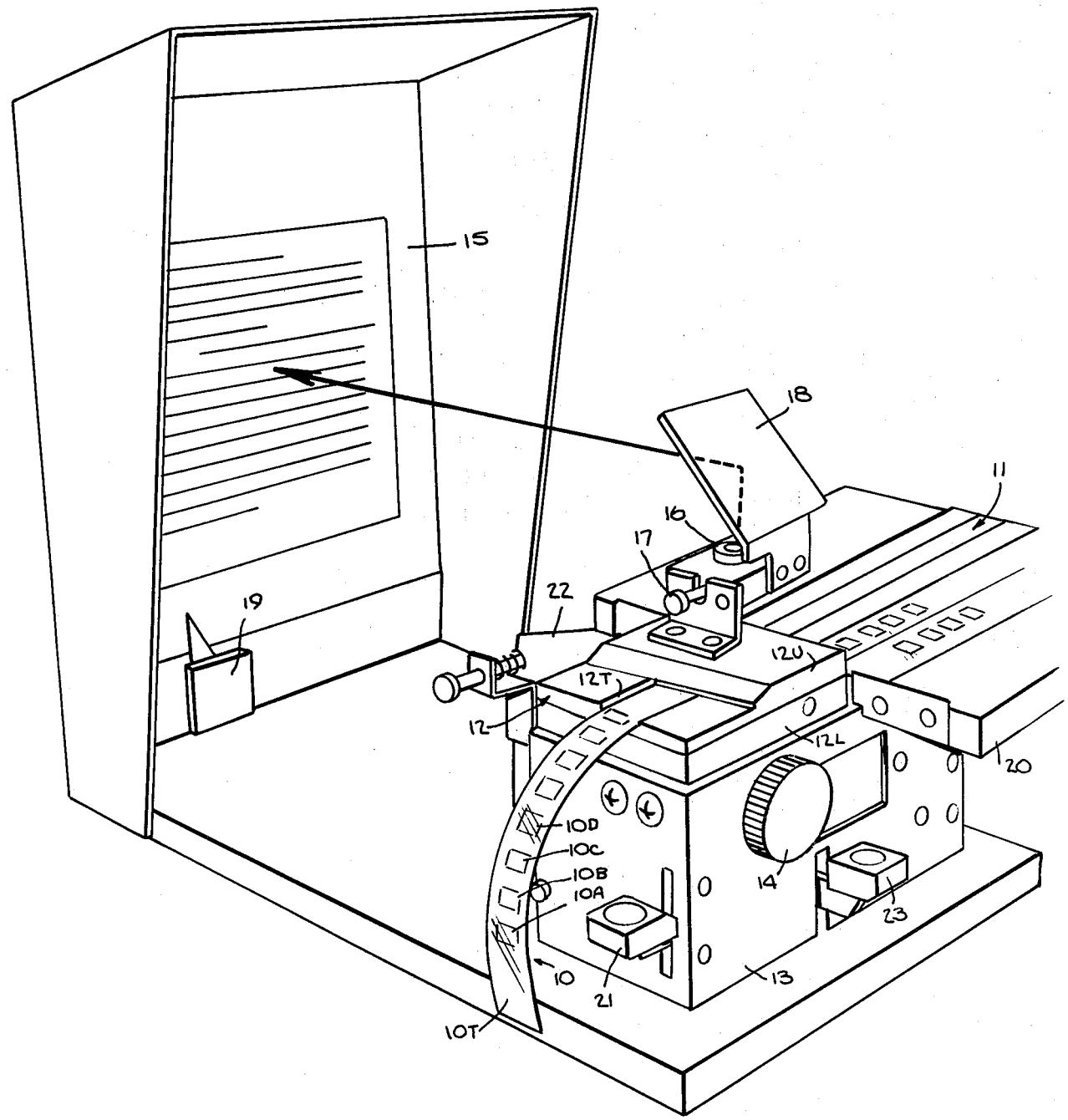
FIG. 1 is a perspective view of a reader-filler machine in accordance with the invention, as viewed from the operator's position.
Figure 2:
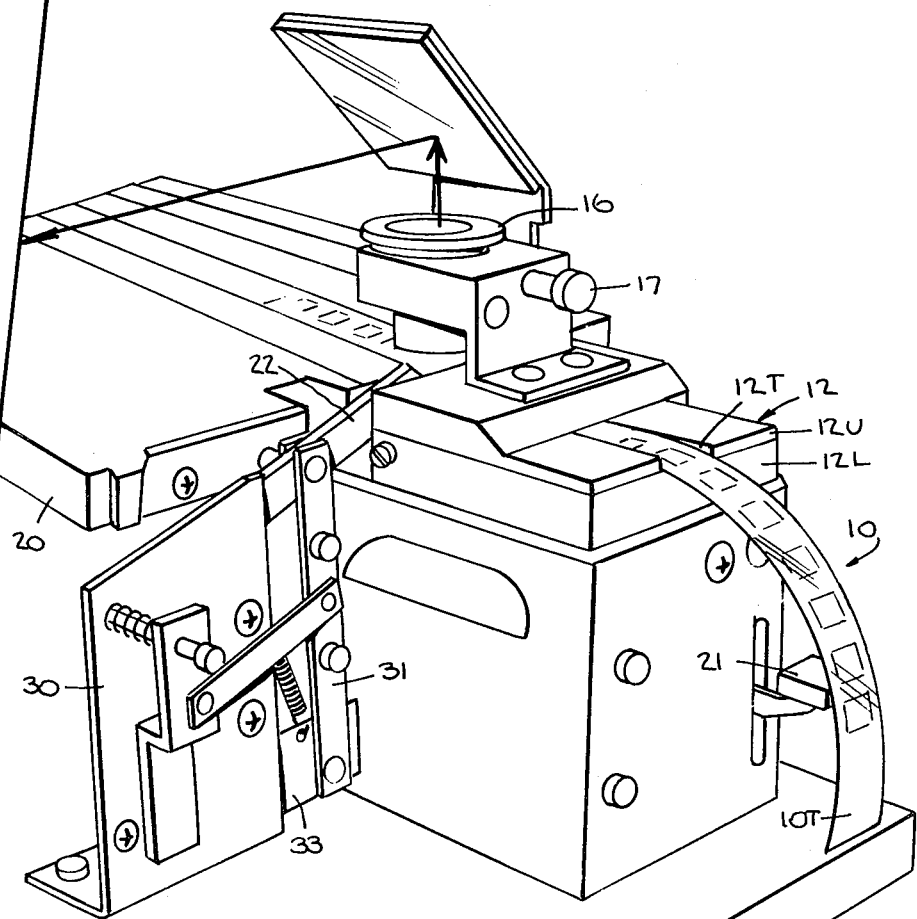
FIG. 2 is a perspective of the machine looking between the viewing screen and the film-drive mechanism.
Figure 3:
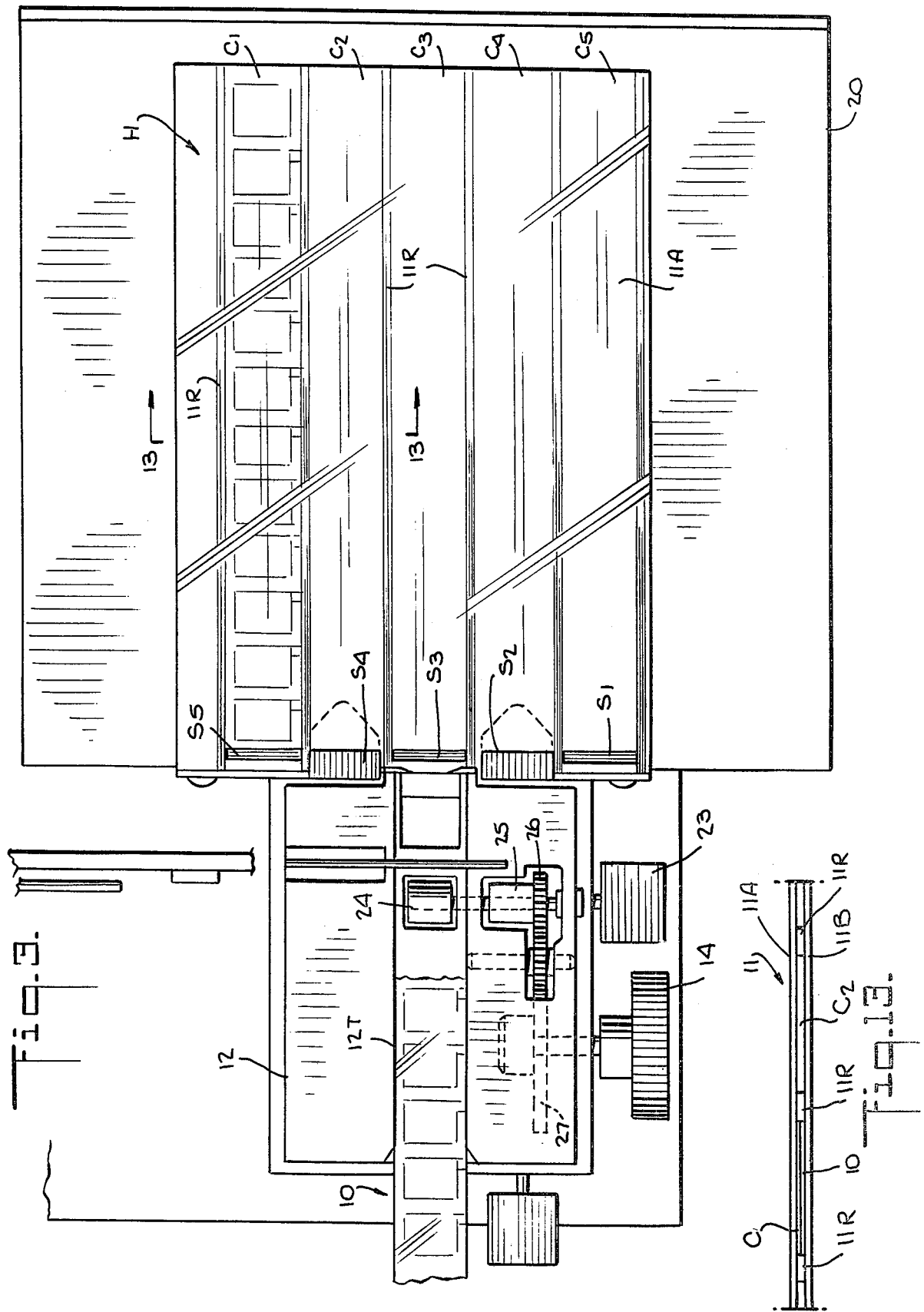
FIG. 3 is a top plan view of the machine.

Referring now to FIGS. 1, 2 and 3, there is shown a reader-filler machine in accordance with the invention for inserting a strip 10 of microfilm into a selected channel of a multi-channel microfiche jacket 11. Strip 10 is of the 16 mm type produced by an office copier such as the "Micle 1200" and therefore has a series of image frames 10A, 10B, 10C etc., and a blank trailer 10T.

Microfilm strip 10 is slidably received within the track 12T of a track block 12 formed by upper and lower plates 12U and 12L molded of plastic material, the block being mounted above a film-drive mechanism 13 provided at one side with an operator's knob 14. When knob 14 is turned clockwise, it advances film strip 10 toward a microfiche jacket lying on a table, counterclockwise rotation effecting a retraction of the strip.

As the image frames on the strip are successively advanced into the selected channel, the frames may be viewed by the operator on the shielded screen 15 of an optical projection system. The frame images are cast on the screen by means including a lens barrel 16 which is axially shiftable along a vertical axis by a focusing knob 17, the illuminated image from the barrel being directed toward the screen by an inclined reflector 18. The screen is provided with a shiftable pointer 19 which is set to indicate the point at which a film cutting blade operates with respect to the film.

Microfiche jacket 11 is placed on a table 20 which is pivotally supported and spring biased, the table being tiltable relative to the exit of track 12T by means of a depressible key 21. Film strip 10 is cut by means of a manually-operated key 23 which actuates a rocker arm 22 supporting a blade.

Figure 4:
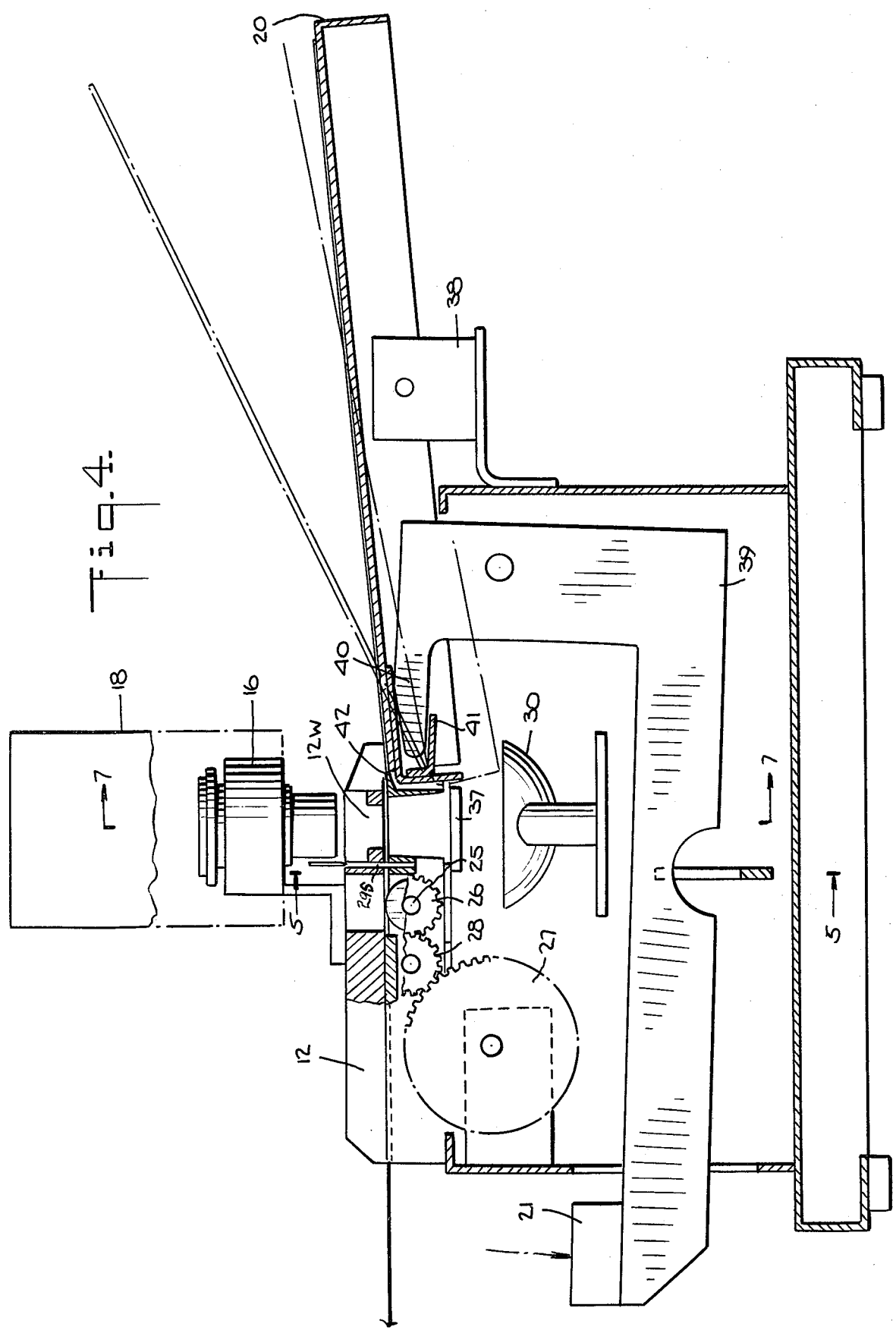
FIG. 4 is a longitudinal section taken through the machine.

As best seen in FIGS. 3 and 4, the drive mechanism for advancing film strip 10 includes a roller 24 which is disposed within an opening in track 12T to frictionally engage the underside of the film confined therein. Roller 24 is supported on a shaft 25 which carries a gear 26. Knob 14 serves to turn a gear 27 on the knob shaft, gear 27 meshing with an idler gear 28 which engages roller gear 26, so that when knob 14 is turned in the clockwise direction, the film is advanced.

Figure 5:
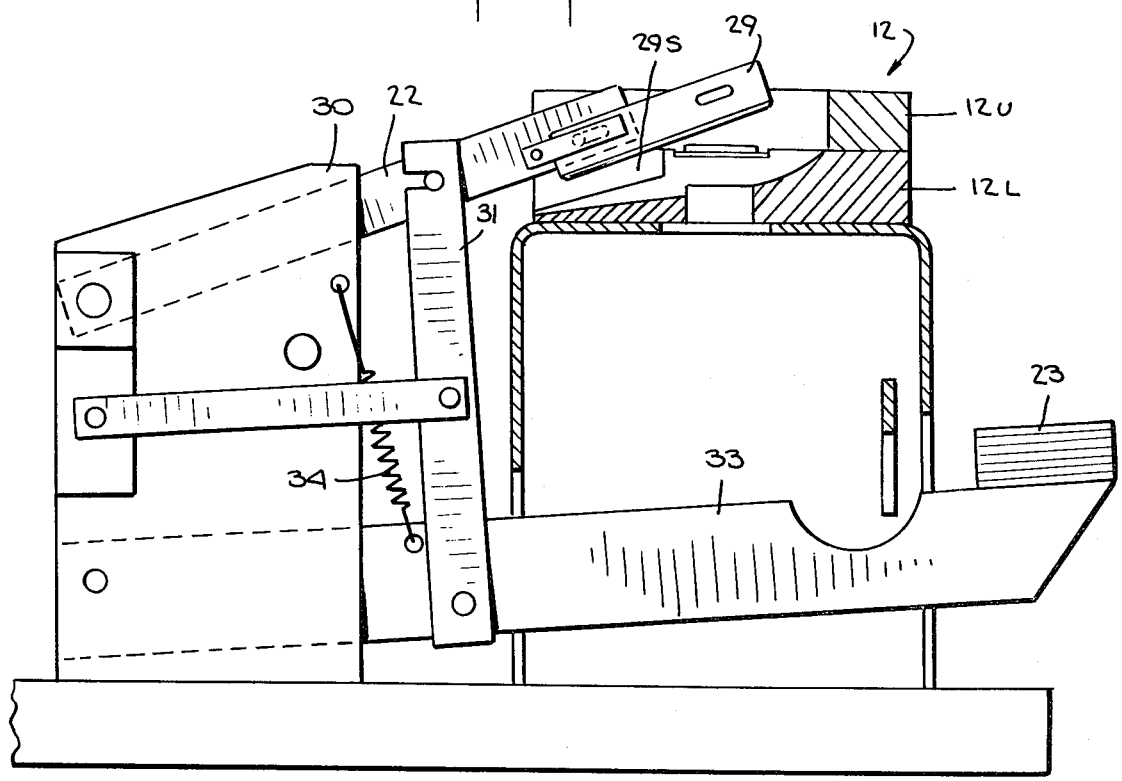
FIG. 5 is a transverse section taken through the operating mechanism for the film-cutting blade shown in FIG. 2.
Figure 6:
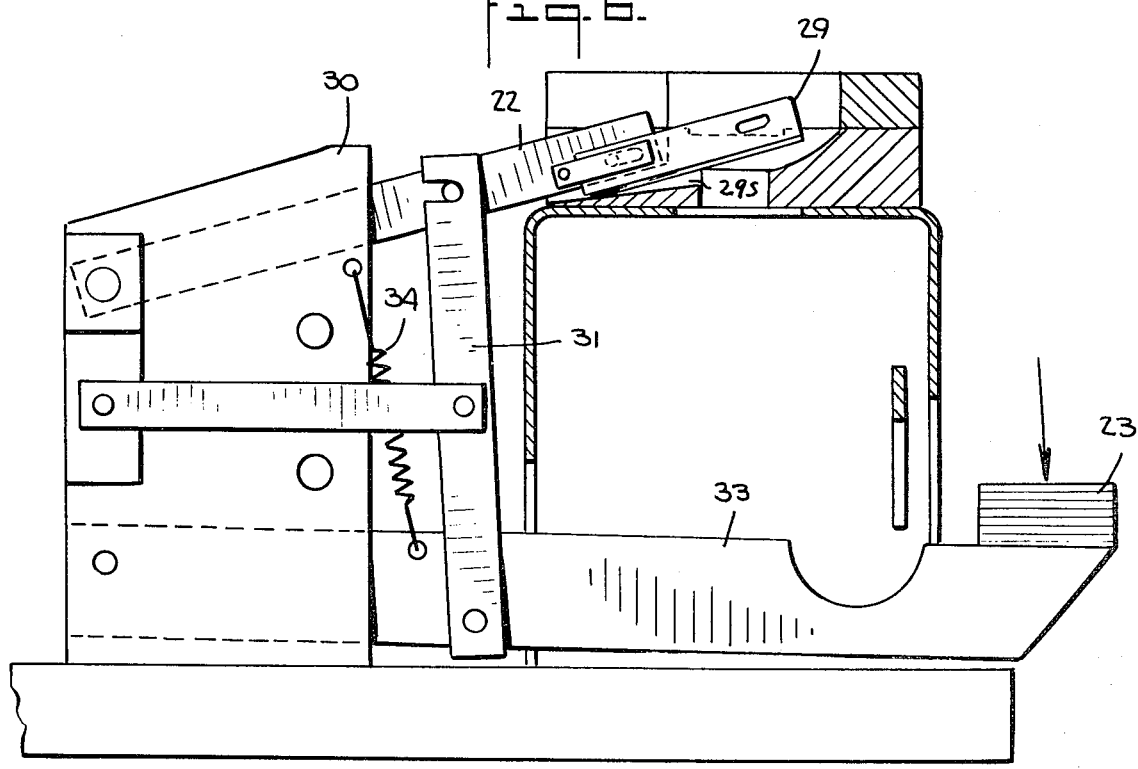
FIG. 6 is the same as FIG. 5, but with the operator key depressed to effect a film-cutting action.

The mechanism for cutting the film includes, as shown in FIG. 5, a blade 29 detachably coupled to the free end of rocker arm 22 whose other end is pivoted on a vertical plate 30. Rocker arm 22 is operatively coupled by a link 31 to a lever 33 also pivoted on plate 30, the free end of lever 33 having key 23 secured thereto. A bias spring 34 connected between lever 33 and plate 30 serves to normally maintain lever 33 in its raised position, thereby holding blade 29 above the film strip. But when key 23 is depressed, as shown in FIG. 6, this acts to swing rocker arm 22 downward to cause blade 29 to enter a transverse slot 29S in the block to slice the film. When key 23 is released, blade 29 returns to its raised position.

Figure 7:
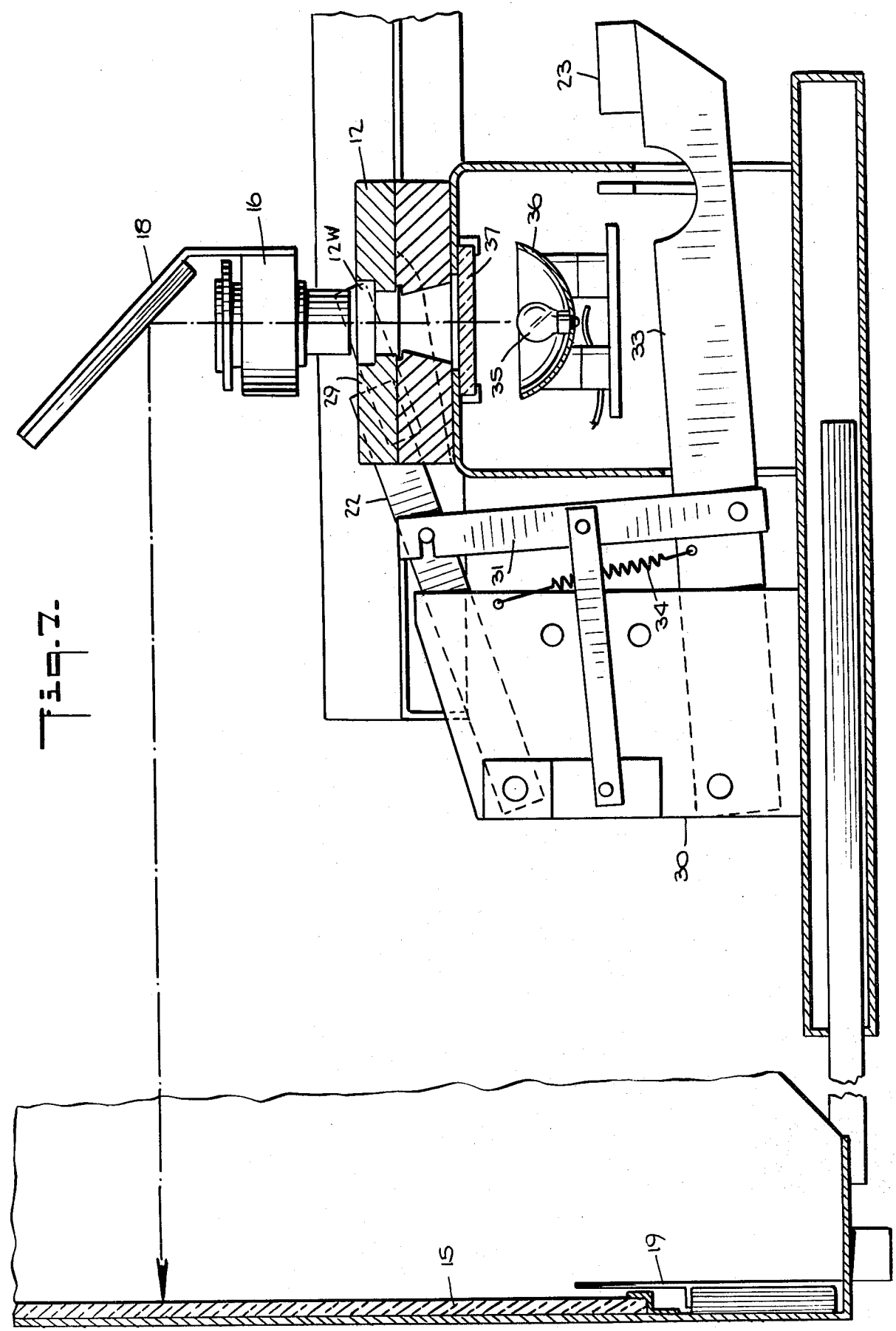
FIG. 7 is a transverse section taken in the plane indicated by line 7—7 in FIG. 4 showing the optical viewing system.

As shown in FIGS. 4 and 7, the optical projection system further includes a lamp 35 disposed within a concave reflector 36 and a heat absorbing glass plate 37, the light rays passing through a well 12W in the track block at a position just in front of slit 29S in the film slicing station. Thus displayed on the screen is the illuminated image of the frame which is about to enter the selected channel in the microfiche jacket, the pointer on the screen indicating the blade position relative to the displayed frame.

Microfiche jacket 11, as shown in FIGS. 3 and 13, comprises superposed transparent top and bottom panels 11A and 11B of synthetic plastic material, such as polyester film or Mylar, which are joined together by spacer ribs 11R to define parallel channels $C_1$ to $C_5$. Slots $S_1$ to $S_5$ cut into the top panel adjacent the front end of the jacket provide a film entry for each channel.

Table 20 on which the microfiche jacket is placed is pivotally supported on a bracket 38, as shown in FIG. 4, and is spring biased (the spring is not shown). Key 21 for tilting table 20 is mounted on the free end of a pivoted L-shaped lever 39 whose other end terminates in a nose 40 which is received within a trap 41 on the underside of table 20 at the front end thereof. Thus when key 21 is depressed, the table is tilted downwardly with respect to a ledge 42 projecting from the lower plate 12L of the track block just below the track exit.

Figure 8:
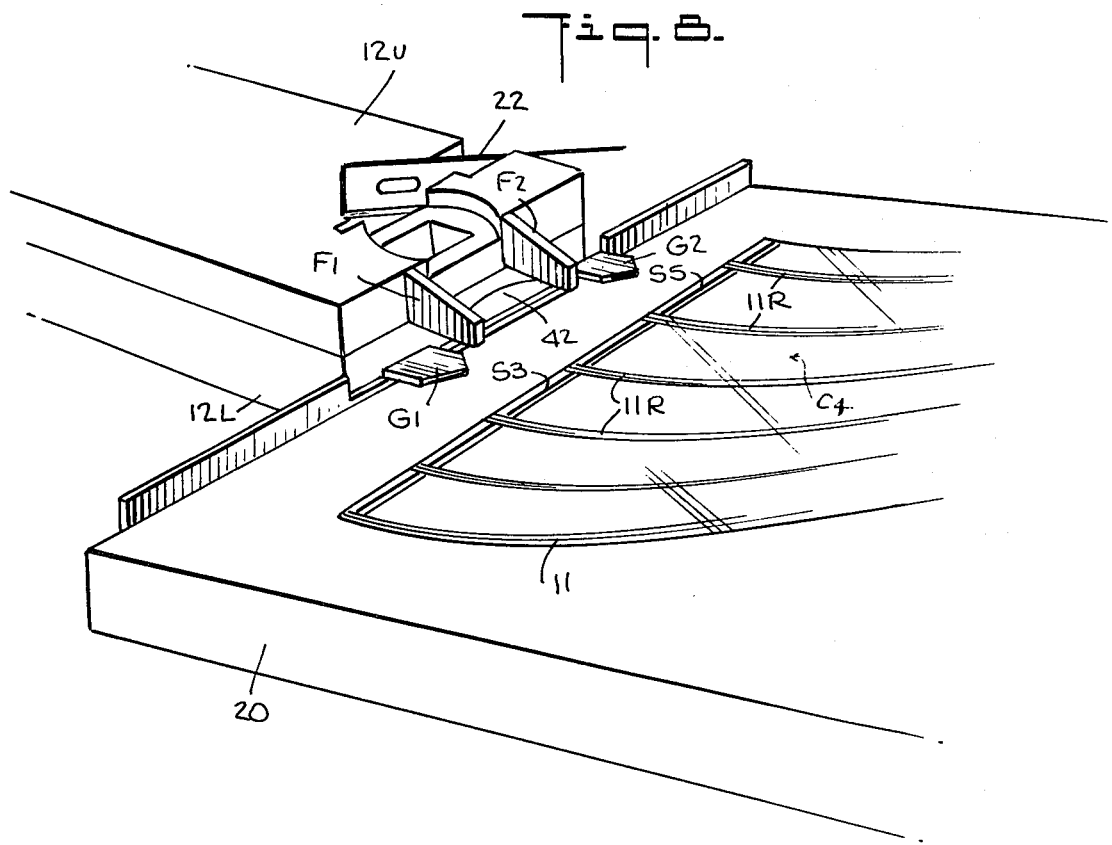
FIG. 8 illustrates, in perspective, the manner in which a microfiche jacket is first placed on the downwardly tilted table of the machine.
Figure 9:
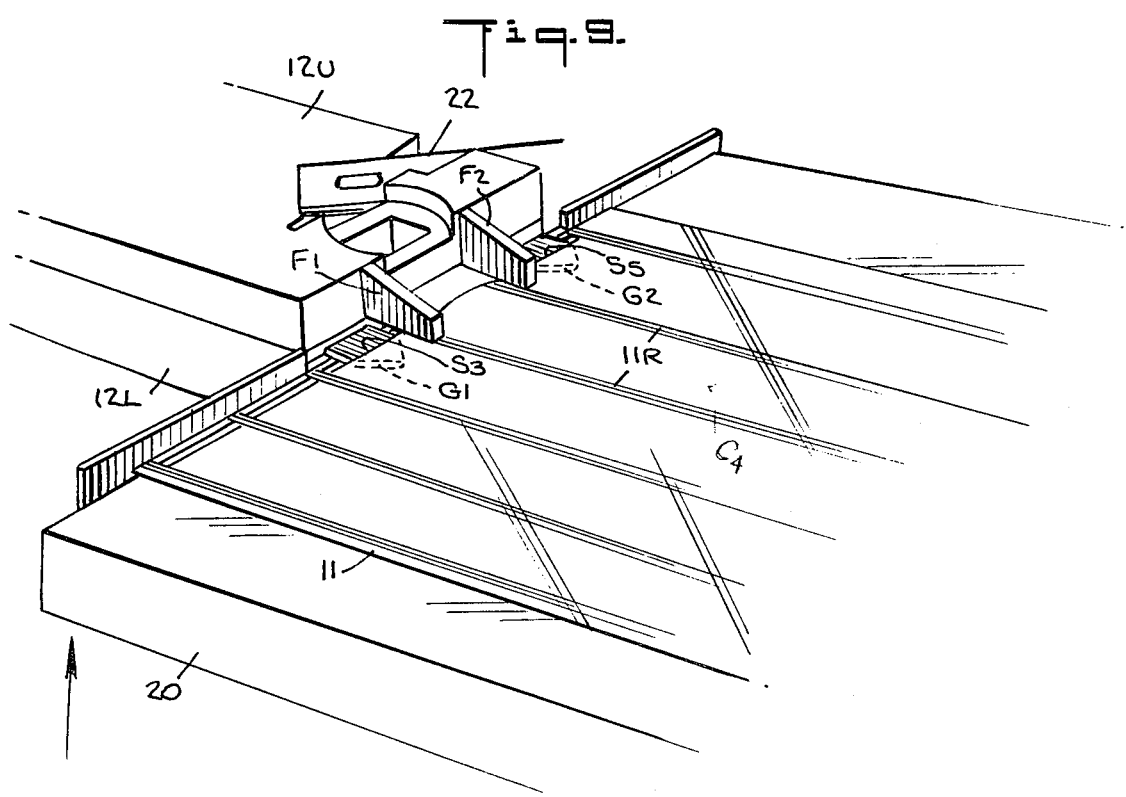
FIG. 9 shows the microfiche jacket lying flat on the tilted table with the locating guides inserted therein.

As best seen in FIGS. 8 and 9, projecting from the upper plate section 12U on either side of the track exit is a pair of pressure fingers $F_1$ and $F_2$, the advancing film strip passing between these fingers over ledge 42. Flanking fingers $F_1$ and $F_2$ are planar locating guides $G_1$ and $G_2$ having triangular points, the guides having a width equal to that of the microfiche jacket channels. Guides $G_1$ and $G_2$ are preferably die cut from a spring metal sheet such as phosphor bronze and are so spaced as to lie in registration with the channels on opposite sides of a channel selected for film insertion. Pressure fingers $F_1$ and $F_2$ are spaced so as to register with the ribs 11R bordering the selected channel.

In order to make a film insertion in a selected channel, table 20, as shown in FIG. 8, is first tilted downwardly by the operator relative to the track exit, as shown in FIG. 8. Microfiche jacket 11 is then held by the operator with its leading end on the table, the jacket being flexed so that the remaining portion of the jacket is raised above the table.

Assuming that the selected channel is channel $C_4$, the jacket is then pushed along the table toward the rear of the track block so that guides $G_1$ and $G_2$ are admitted into the respective entry slots $S_3$ and $S_5$ of channels $C_3$ and $C_5$, as shown in FIG. 9, at which point channel $C_4$ is properly oriented with respect to the track exit. Because the guides are pointed, this operation is easy to perform; for as long as a guide point enters a channel slot at any point, the guide will then bring the channel into alignment therewith.

Figure 10:
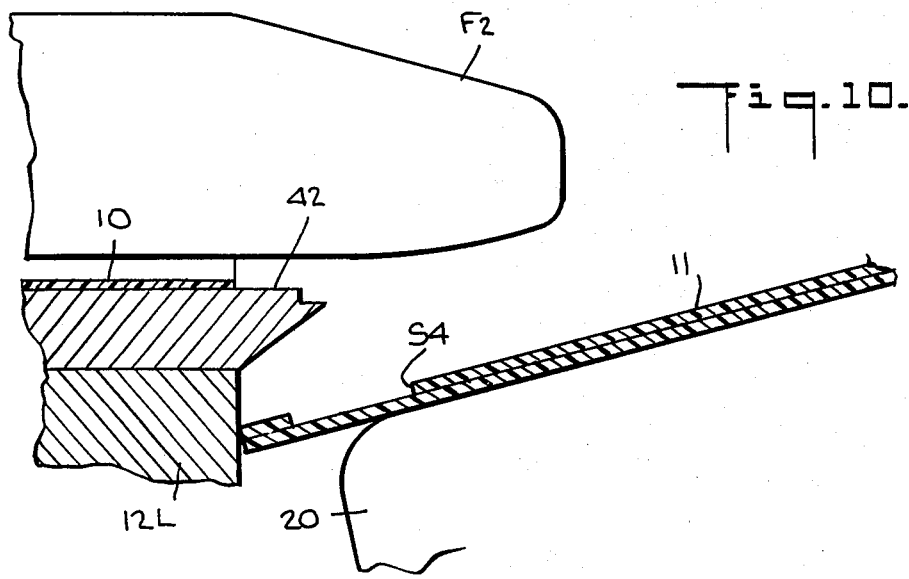
FIG. 10 illustrates the relationship of the leading end of the microfiche jacket lying on the downwardly-tilted table to a ledge projecting from the film drive mechanism.
Figure 11:
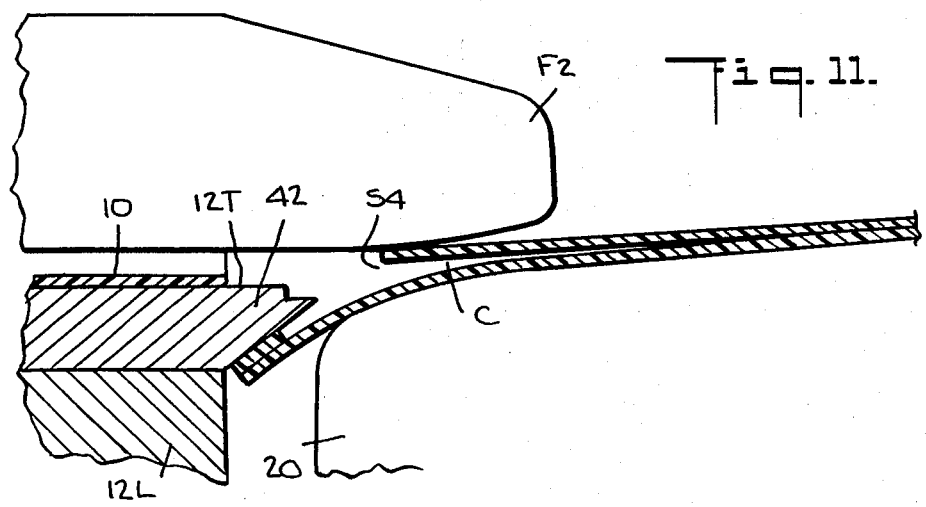
FIG. 11 shows the relationship of the leading end of the microfiche jacket to the ledge when the table is released, at which point the entry slot of the selected channel lies in registration with the film track exit.

Since table 20 is tilted downwardly, the resultant relationship is that shown in FIG. 10 where it will be seen that the microfiche jacket which now lies flat on table 20 has its leading margin extended beyond the front end of the table to abut the rear of lower plate 12L below ledge 42. Table 20 is then released, as a consequence of which, as shown in FIG. 11, the surface of the table is now in the same plane as the floor of track 12T, whereas the leading margin of the microfiche which abuts the underside of ledge 42 is now flexed thereby to open entry slot $S_4$ in selected channel C in readiness for insertion. The pressure fingers $F_1$ and $F_2$ are pressed against the ribbed border of the selected channel to resist displacement of this channel relative to the track.

Figure 12:
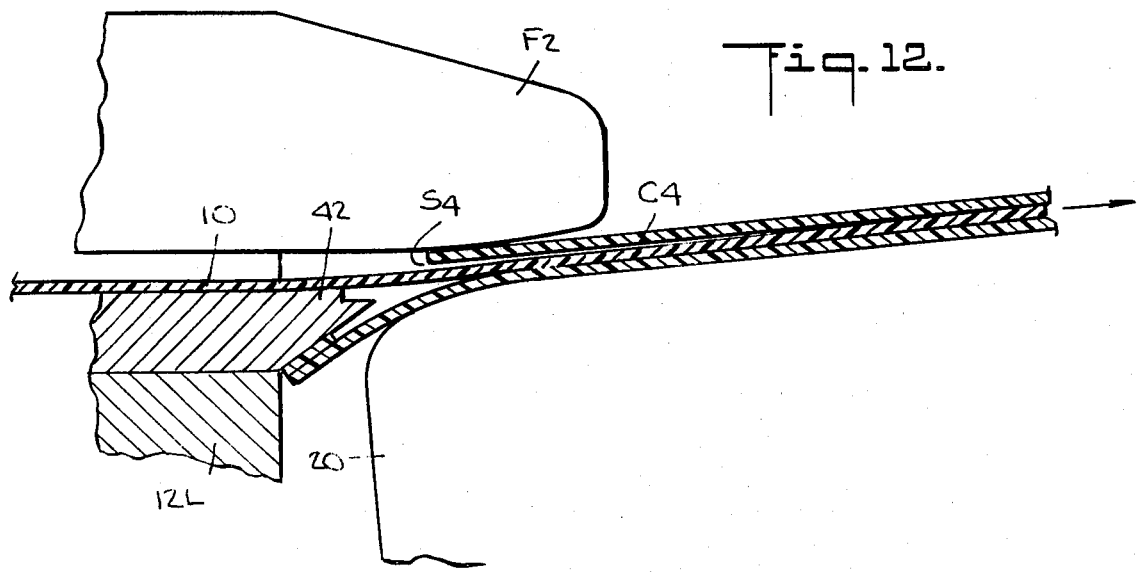
FIG. 12 shows the film strip entering the channel through the slot.

Now film 10, as shown in FIG. 12, is advanced by the drive mechanism for full or partial insertion into selected channel $C_4$, the point at which the strip is to be cut being determined by viewing the optical screen on which the film frames are sequentially presented.

Since the severed end of the film strip lies on the track and is therefore displaced from the entry slot of the channel, in order to complete insertion the remaining portion of the film strip behind the severed end is advanced by the drive mechanism to push the cut strip fully into the channel. After insertion is completed, the remaining portion of the strip is retracted. In those instances where all frames on the strip are inserted in a channel, the remaining portion is then constituted by the trailer. In other cases, the remaining portion may be a blank strip zone plus the trailer.

Both locating guides $G_1$ and $G_2$ are inserted in adjacent channels opposite the selected channel when the selected channel is interposed therebetween. But when the selected channel is channel $C_1$ or $C_5$, then there is a channel adjacent only one side, in which event only one guide functions to effect location of the selected channel.

Thus a reader-filler machine in accordance with the invention requires no indexing mechanism to align a selected channel with the film track; and while the alignment is carried out manually, it takes no particular care to effect a proper alignment. And since the machine presents the film frame on the screen with reference to a pointer indicating the blade position, one can exactly cut the film at any desired junction.

While there has been shown and described a preferred embodiment of a reader-filler machine for inserting film strips into microfiche jackets in accordance with the invention, it will be appreciated that many changes and modifications may be made therein without, however, departing from the essential spirit thereof. Thus while the machine is shown as it operates to insert discrete film strips, the machine may be provided with a mounting for a film reel, film drawn from the reel being conducted along the track.

I claim:

1. A machine adapted to insert a strip of microfilm having a series of image frames thereon into a selected channel of a microfiche jacket provided with parallel channels, each channel having the same width and having an entry slot adjacent the front end thereof, the machine comprising:

(A) a track block having a track for receiving the film strip and conducting it toward an exit;

(B) a film drive mechanism for advancing the film strip along the track toward said track exit or to retract the strip;

(C) a table whose front end is adjacent said track exit for supporting a microfiche jacket which is shiftable thereon toward said block; and (D) a pair of planar locating guides projecting from the block, each guide having a width substantially equal to the width of the channel, said guides being spaced apart to an extent that when the jacket is shifted on said table toward said block and the channel selected to be filled has adjacent channels on either side thereof, the guides then enter the entry slots in the adjacent channels to properly orient the selected channel with respect to the track exit; and (E) means cooperating with the block to slice the film on the track.

2. A machine as set forth in claim 1, wherein said guides are formed of sheet metal and provided with triangular tips.

3. A machine as set forth in claim 1, further including a pair of pressure fingers projecting from said block to engage the borders of the selected channel, the film emerging from the track exit passing between the fingers.

4. A machine as set forth in claim 3, wherein said table is pivotally mounted and spring-loaded, and further including a ledge projecting below the track exit whereby when the table is tilted downwardly with respect to the track exit, the front margin of the microfiche jacket lies below the ledge; and when the table is released, the margin is engaged and bent by the ledge to open up the entry slot of the selected channel.

5. A machine as set forth in claim 1, further including an optical system to illuminate and display the portion of the film on the track adjacent the track exit to determine the proper slicing position on the film.

6. A machine as set forth in claim 5, wherein said system includes a light source placed below the block and a lens barrel above the block.

7. A machine as set forth in claim 6, further including means to axially shift the barrel to effect focusing.

8. A machine as set forth in claim 1, wherein said film slicer includes a blade mounted on the free end of a rocker arm, the blade being normally raised above a slit in the block, and a lever operatively coupled to the arm having a depressible key which, when actuated, swings said arm to cause said blade to enter the slit.

9. A machine as set forth in claim 8, wherein said lever is coupled to said arm by a link.

* * * * *